United States Patent [19]

Mehier

[11] Patent Number: 4,477,063

[45] Date of Patent: Oct. 16, 1984

[54] DEVICE FOR HOLDING A WORKPIECE IN POSITION DURING A MACHINING OPERATION, ESPECIALLY A DRILLING OPERATION

[76] Inventor: Henri Mehier, 18 quai Tilsit, 69002 Lyon, France

[21] Appl. No.: 285,541

[22] Filed: Jul. 21, 1981

[30] Foreign Application Priority Data

Jul. 25, 1980 [FR] France .............................. 80 16757

[51] Int. Cl.³ .............................................. B25B 1/00
[52] U.S. Cl. ..................................... 269/93; 269/97; 269/236
[58] Field of Search ................. 269/91, 93, 94–97, 269/166, 196–199, 258, 236, 265; 408/103, 109, 95, 97, 98

[56] References Cited

U.S. PATENT DOCUMENTS

| 824,000 | 6/1906 | Elmer | 269/236 |
|---|---|---|---|
| 2,486,638 | 11/1949 | Eshleman | 269/93 |
| 3,333,487 | 8/1967 | Parry | 408/97 |
| 3,345,589 | 10/1967 | Yunt et al. | |
| 3,345,889 | 10/1967 | Yunt et al. | 269/236 |
| 3,382,742 | 5/1968 | Gibbs | 408/97 |
| 4,025,064 | 5/1977 | Disston et al. | 269/166 |
| 4,232,856 | 11/1980 | Eichfeld et al. | 269/93 |
| 4,299,146 | 11/1981 | Phelps | 269/258 |

FOREIGN PATENT DOCUMENTS

| 1441509 | 5/1966 | France | 408/95 |
|---|---|---|---|
| 1328195 | 8/1973 | United Kingdom . | |

Primary Examiner—Robert C. Watson
Attorney, Agent, or Firm—Arnold, White & Durkee

[57] ABSTRACT

A device for locking a workpiece in position on a working plane for a machining operation. The device includes a column to be mounted to extend perpendicularly from such a working plane, and a locking assembly slidably displaceable along the column. The locking assembly includes two gripping members positioned in opposed relationship on opposed sides of the column for each gripping member to partially embrace the column; a pressure member displaceably connected to the gripping members to extend therefrom and to be displaceable relatively thereto; and means operable by means of a single control lever to displace the two gripping members towards each other to tighten onto the column, and to cause the pressure member to swivel relatively to the gripping members for locking a workpiece in position on such a working plane.

15 Claims, 10 Drawing Figures

DEVICE FOR HOLDING A WORKPIECE IN POSITION DURING A MACHINING OPERATION, ESPECIALLY A DRILLING OPERATION

The present invention relates to a perfected, simple and efficient device for holding in place and positioning any workpiece during a machining operation, such as, for instance, a drilling operation, a milling operation, a sawing operation, or the like.

As of today, whenever a workpiece has to be machined, the most commonly used solutions for holding the workpiece in place and for positioning the workpiece consist in utilizing vises, vise grips, adjustable clamps, staples, etc.

While such apparatus are efficient they do, however, present a certain number of disadvantages, such as, for instance, that they do not permit a workpiece to be locked in position and to be released practically immediately, when required.

Now, a simple and efficient device has been invented, which is the object of the present invention, and which eliminates the disadvantages of the previous solutions, and enables a workpiece to be machined to be held in position practically immediately or instantaneously on a working plane in an efficient manner, and without much effort. Such a device also presents the advantage that it can be utilized to hold workpieces with extremely variable shapes and dimensions, in position.

In general, the invention therefore relates to a device for holding a workpiece in position on a working plane during a machining operation, especially during a drilling operation, the device being of the type essentially comprising a column mounted to extend perpendicularly to the working plane, and a locking assembly mounted to slide along said column.

The arrangement in accordance with the invention is characterized by the fact that the locking assembly itself comprises:

two gripping members each partially encircling or embracing the column, and placed facing each other on opposed sides of this column, a pressure member or rod connected to said gripping members, and capable of being displaced, relatively to the working plane, and means under the action of a single action control lever, permitting on one hand tightening of both gripping members onto the column and, on the other hand, simultaneously or after a short time interval, causing swiveling in the direction of the working plane, of the pressure member or rod end in contact with the workpiece to be held in position, to lock such a workpiece in position on the working plane.

The pressure member or rod may conveniently be slidably displaceable in a plane generally parallel or parallel to the working plane, or in a plane directed in the direction of the working plane.

The gripping members may be referred to as rings, and may be in the form of semi-annular rings or sleeves, in the form of ring sections or sleeve sections, or the like. They may, in fact, be of any appropriate configuration which will allow them to be placed on opposed sides of a column to cooperate therewith and engage therewith.

According to one embodiment, the leading gripping member on the side of the column on which the workpiece is to be locked in position, comprises two side plates which can fit into two grooves provided at the periphery of the second or trailing gripping member, said plates having such a length that they extend away from the column, and they include, on one hand some elements for holding up and guiding the pressure rod and, on the other hand, some grooves forming a bearing for an axle supporting two sets of cams controlled by a single lever, one bearing on the back of the trailing gripping member in order to cause the tightening of said gripping members on the column, the other acting on the pressure rod and causing its swiveling action towards the working plane in order to cause the tightening of the workpiece to be locked in position.

In this embodiment, the pressure rod has the convenient shape of a subassembly with two parallel arms with convergent ends, said subassembly being supported by two sets of rollers, mounted on both sides of the front or leading gripping member, the rollers being positioned in planes which are parallel to the working plane and which are spaced from each other.

In a variation of this embodiment, the device according to the invention is characterized by the fact that the two gripping members partially encircling or embracing the stationary column consist of two rollers mounted on a common supporting plate and spaced apart from each other, these rollers having two notches permitting them to be fitted to said column. In this embodiment, the axes of the rollers are again arranged in parallel spaced planes which are parallel to the working plane with the leading roller on the side of the workpiece to be fastened in position, being situated at a higher level than the back or trailing roller.

In this embodiment, the pressure rod acting on the workpiece to be locked in position is carried by the plate supporting the rollers, for instance by means of two bearings in which it can slide freely and longitudinally. The means for locking the rollers against the column, as well as for causing the pressure rod end to swivel in the direction of the working plane, is provided by the same axle or shaft supporting the back roller, which in this embodiment comprises an eccentric capable of being angularly displaced under the action of a single lever.

The spacing between the rollers, and the configuration of the notches, will of course be governed by the section of the supporting column.

In a further alternative preferred embodiment, the pressure rod may include two arms which are mounted on or attached to opposed sides of the leading gripping member such that both arms can swivel independently of each other with respect to the column. This permits a more efficient locking in position of workpieces varying in shape, and especially varying in thickness.

The invention and the advantages deriving therefrom, however, may be more fully understood from the following detailed examples of embodiments, given as an indication without the invention being limited to said examples, and which are illustrated by the accompanying drawings, in which:

FIG. 8 is also a view in perspective showing another variation wherein the two arms forming the pressure rod may be moved independently of each other thereby permitting the tightening of workpieces having irregular shapes, FIGS. 9 and 10 respectively being closeup views of the subassembly operating the locking of the gripping member, and of the back gripping member of such subassembly.

Throughout the following description, for the various embodiments which will be developed more in detail, the same reference numerals will be utilized to designate the same components or similar components.

With reference to the accompanying drawings, the locking device according to the invention for holding a workpiece (1) on a working plane (2) during a machining operation, for instance a drilling operation, essentially comprises:

a column (3), attached to extend perpendicularly to the working plane (2), and a locking assembly mounted to slide along said column (3).

The locking assembly essentially comprises:

two gripping members in the form of rings (4-5), each partially encircling or embracing the column (3), and arranged on opposed sides of this column [Throughout the following description the gripping member or ring (4) placed on the side of the workpiece (1) will, for ease of reference, be designated the "front or leading ring", whereas the gripping member or ring (5), in contradistinction, will be designated the "back or trailing ring"];

a pressure rod (6), connected to said rings (4-5), capable of sliding in a plane roughly parallel to the working plane (2); and means, under the action of a single control lever (7), permitting on one hand the tightening of both rings (4-5) against the column (3) and, on the other hand, simultaneously or at a slight interval thereafter, causing swiveling of the end of the pressure rod (6) in contact with the workpiece to be held in position, in the direction of the working plane (2).

Figure 1:
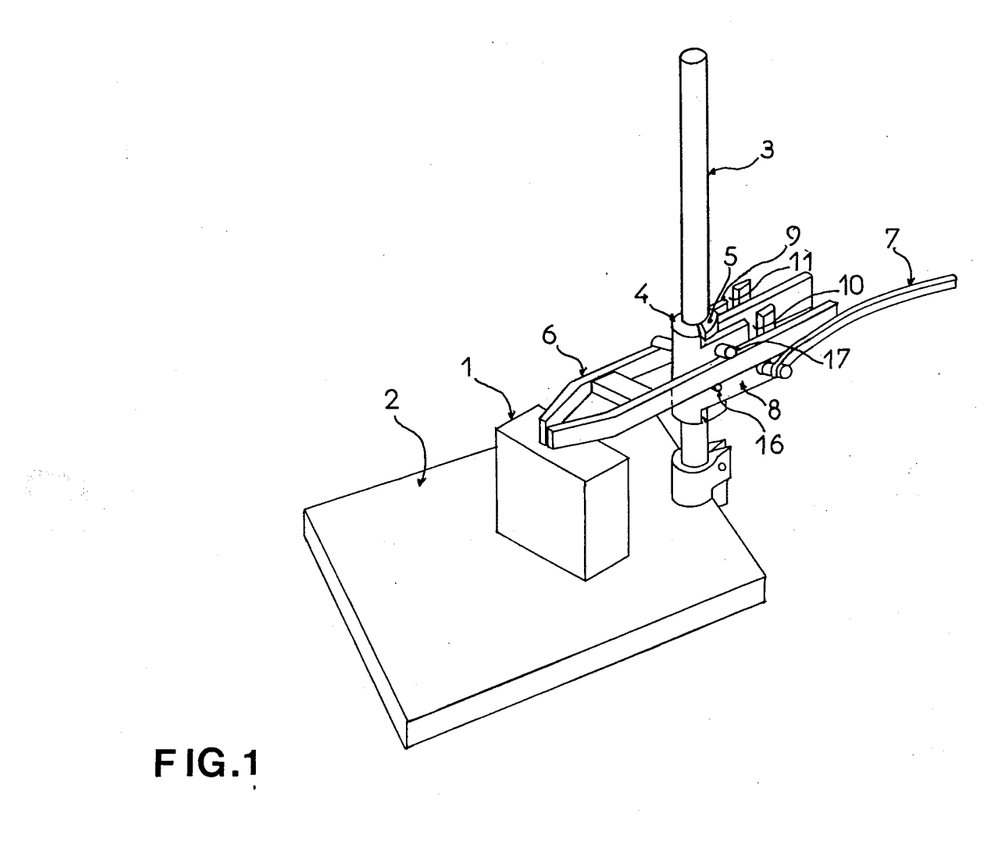
FIG. 1 is a diagrammatic view in perspecitve illustrating one embodiment of a device for holding a workpiece in position on a working plane, according to the invention.
Figure 2:
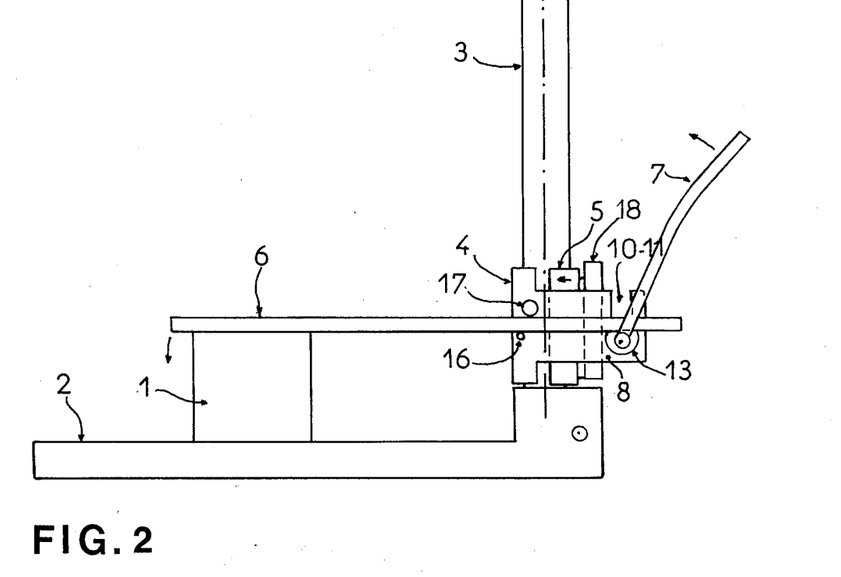
FIGS. 2 and 3 are respectively elevation and top views of such a locking device.
Figure 3:
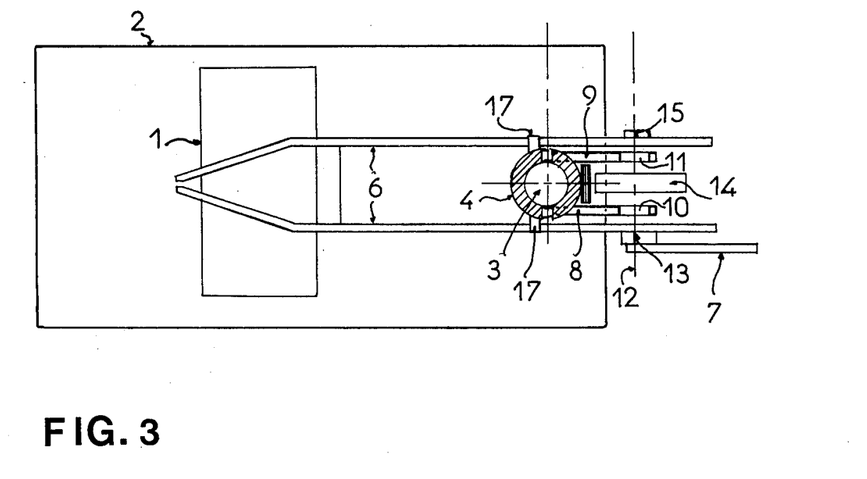

In the embodiment illustrated by FIGS. 1, 2 and 3, the leading ring (4), located on the side of the workpiece (1) to be held in position, comprises two side plates (8-9), which can be fitted into two grooves provided at the periphery of the trailing ring (5). These plates (8-9) have such a length that they extend away from the stationary column (3). The subassembly made of the front ring (4) and the side plates (8-9) includes, on the one hand some elements for supporting and guiding the pressure rod (6) and, on the other hand, some grooves (10-11) forming a bearing for an axle (12) supporting two sets of cams (13-14-15), driven by a single lever (7), one cam (14) resting on the back ring (5), and the others (13-15) being placed underneath the pressure rod. The pressure member or rod (6), in the present case, comprises two parallel arms arranged on both sides of the subassembly formed by the rings (4-5) and the plates (8-9). In this embodiment, the support and the guiding of the pressure rod (6) is obtained by means of two pairs of rollers (16-17) arranged on both sides of the ring (4). These rollers (16-17) are arranged in two planes parallel to the working plane (2) and spaced from each other by a distance corresponding approximately with the thickness of the pressure rod (6). Moreover, the lower roller (16) is offset forwardly with respect to the upper roller (17) which serves as the swiveling point. Lastly, a plate (18) may be attached to the back ring (5) for the cam (14) to come to rest on and bear against this plate (18).

The device is used in the following manner. In a first step with the two rings (4-5) exerting no pressure against the column (3), the workpiece (1) is placed on the working plane (2), and by sliding the locking assembly along said column (3) the end of the pressure rod (6) is positioned on the workpiece (1). After this has been done, by displacing the lever (7), the axle (12) is made to rotate thereby rotating the cams (13-14-15). The cam (14) bears onto the ring (5) through the plate (18), and therefore causes tightening of the two rings (4-5) around and onto the column (3). Simultaneously therewith, or shortly thereafter, the cams (13-15) acting underneath the rod (6) operate to lift the rear portion of the rod (6). As a result, by resting on the roller (17) it swivels around the roller (16) and therefore swivels in the direction of the working plane (2) for the end of the pressure rod (6) in contact with the workpiece (1) to lock the workpiece in position. To release the workpiece after a drilling operaton for example, all that has to be done is to reverse the action on the lever (7). This will practically immediately release the machined workpiece.

Figure 4:
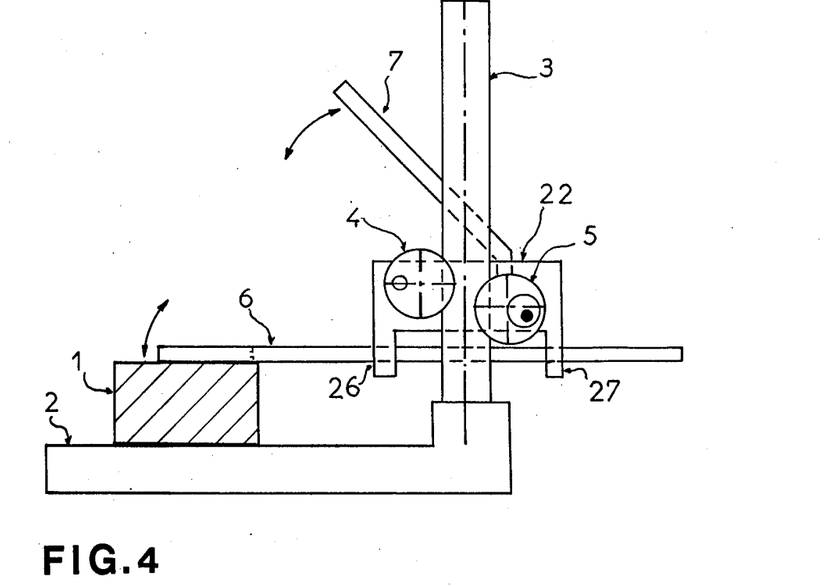
FIGS. 4 and 5 are respectively elevation and top views of a second embodiment according to the invention.
Figure 5:
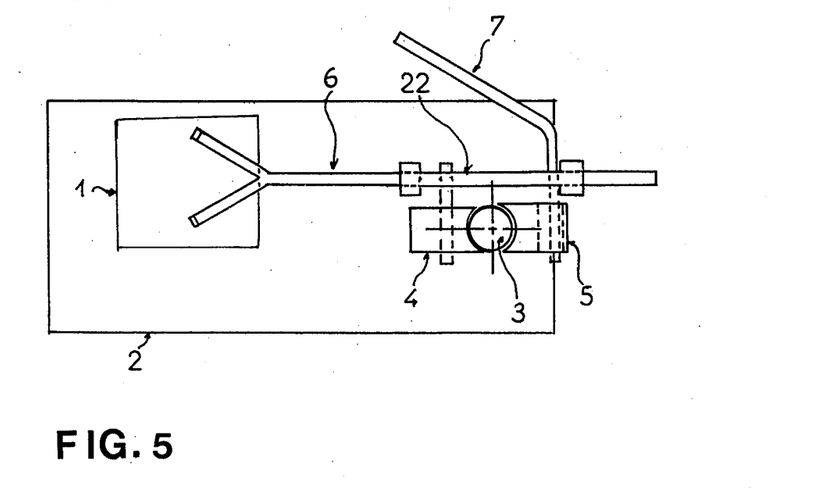
Figure 6:
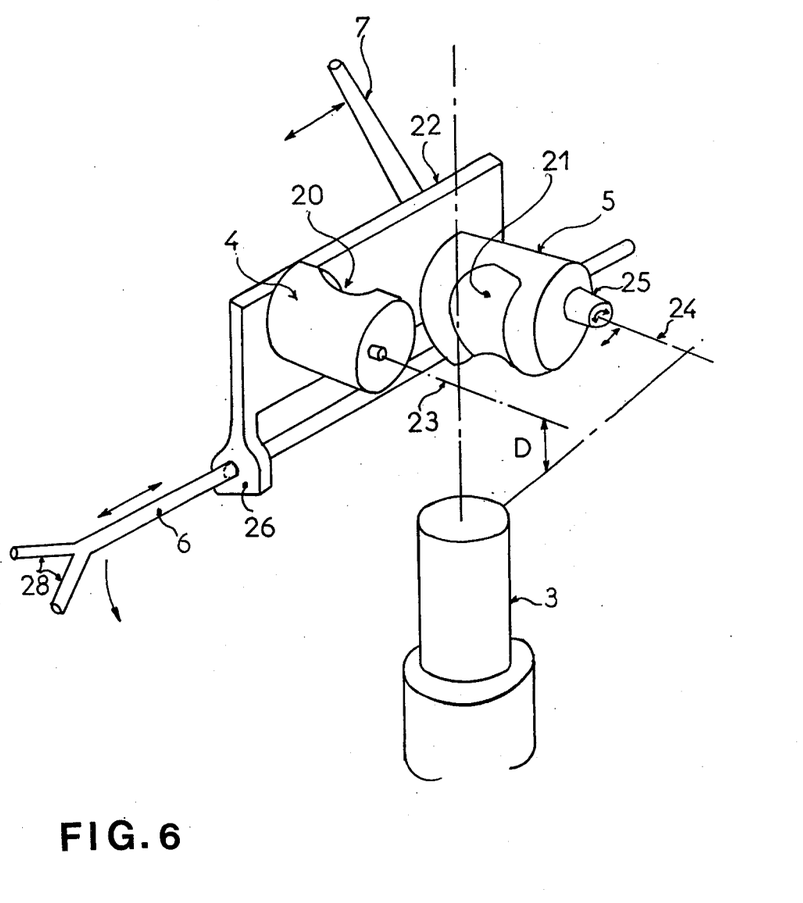
FIG. 6 is a diagrammatic partial view in perspective of the embodiment illustrated by FIGS. 4 and 5.

The second embodiment graphically illustrated by FIGS. 4, 5 and 6 differs essentially on the following basis.

In this embodiment, the two gripping members or rings (4-5) which permit sliding and locking of the assembly on the column (3) consist of two cylindrical rollers, each with a notch (20-21) (FIG. 6) allowing them to fit around the column (3). These rollers are mounted on a common supporting plate (22) through axes (23-24). The planes of the axes (23-24), parallel to the working plane, are spaced at a distance D from each other. The roller (5) is mounted on an eccentric (25) which can be driven by means of a lever (7).

In this embodiment, the plate (22) supporting the rollers (4-5) is also used as an element to maintain the pressure rod (6) positioned. To that effect, at the lower part of this plate (22) two bearings (26-27) are provided (to serve the same function a tube may, for example, be used instead), in which said rod (6) may freely slide. In this embodiment, the pressure rod (6) has a V-shaped active end (28). This does of course not limit the scope of the invention since it may have any other shape. Thus, for example, it may have some notches for the support of tubular elements.

This device is used in the following manner. As before, during the positioning of the workpiece (1) on the working plane (2), the two rollers (4-5) are released from the column (3). This is achieved by changing the position of the eccentric (25) on which the roller (5) is mounted by displacing the lever (7). The rod (6) is then brought into contact with the workpiece (1). Thereafter, by displacing the lever (7), the eccentric (25) is made to rotate to cause the rollers (4-5) to tighten around the column (3). At the same time the active end of the pressure rod (6) is swiveled or pivoted in the direction of the working plane (2) and therefore tightens the workpiece (1) on the working plane (2). The machining operation may then be performed and the release of said workpiece is thereafter obtained by reversing the direction of displacement of the lever (7).

Figure 7:
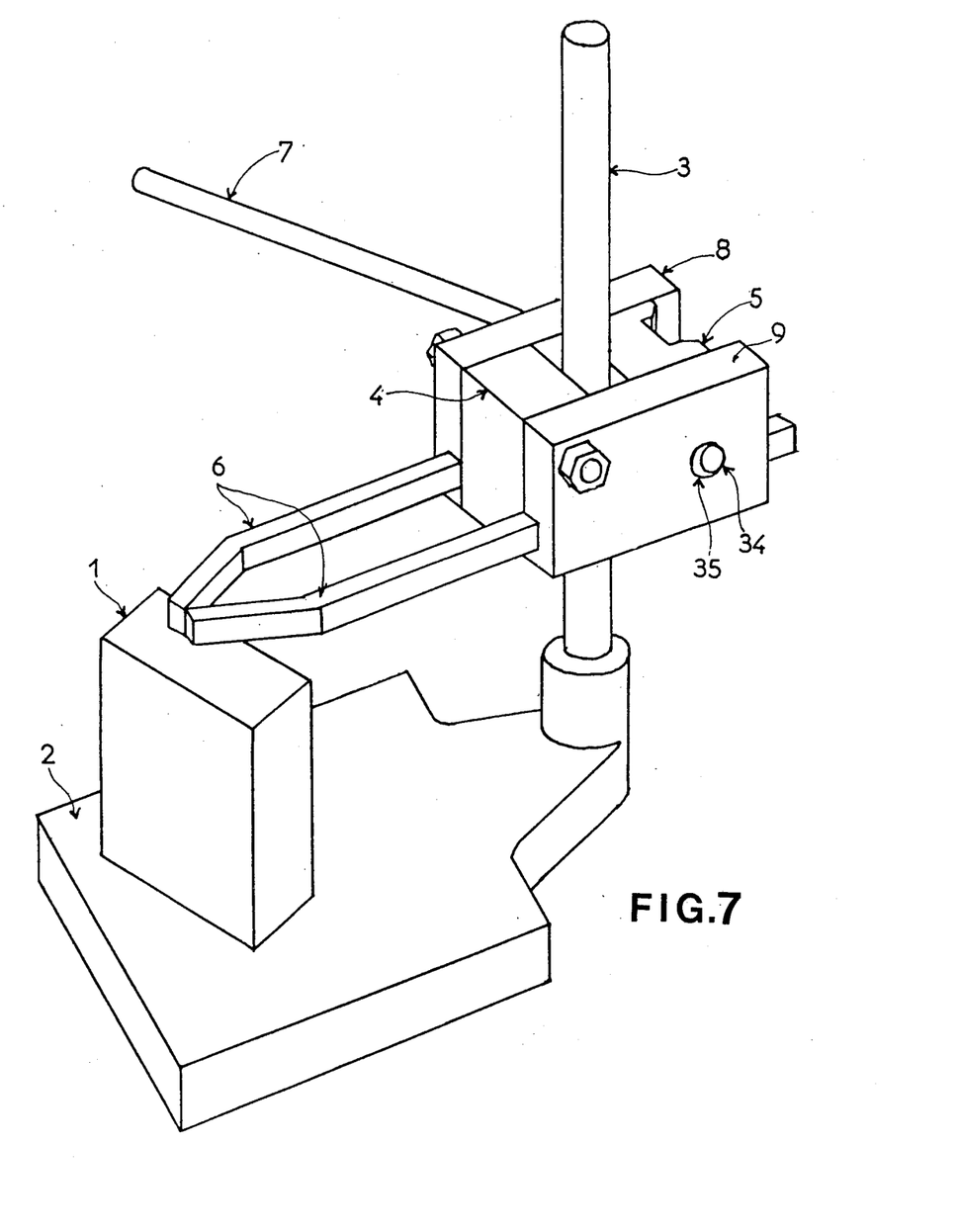
FIG. 7 is a view in perspective illustrating a variation of the embodiments depicted in FIGS. 1, 2 and 3.
Figures 8, 9, 10:
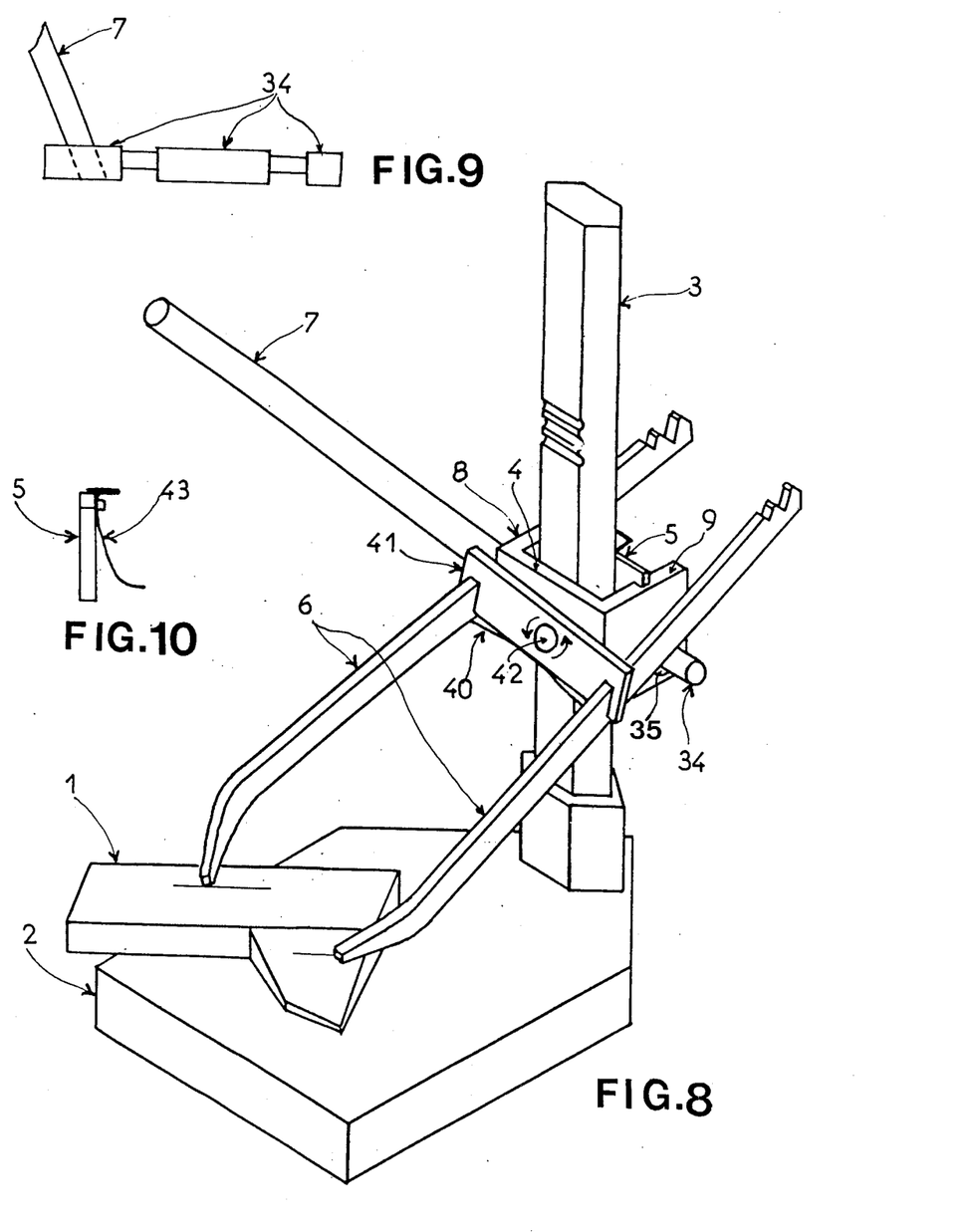

In the variations of the invention depicted in FIGS. 7 and 8, the gripping members (4–5) placed on opposed sides of the column (3) consist of two roughly parallelepipedic blocks.

On both sides of the member (4) the member holds the side parts (8–9) used as supporting and positioning elements for the pressure rod (6) which comprises two parallel arms. In this arrangement, locking against the column (3) is achieved by means of a single control lever (7) causing the rotation of a cam (34). This arrangement is shown in more detail in FIG. 9. The central part of the cam (34) causes tightening of the back member (5) against the column (3), this being facilitated by the fact that the opening (35) provided in the side parts (8–9) has a diameter larger than that of the two end cam portions of the cam (34). The openings (35) are enlarged relative to the periphery of the cam to facilitate pivotal displacement of the cam. This arrangement also enables the pressure arms to be relatively independent in the embodiment shown in FIG. 7.

In the variation illustrated in FIG. 8, the pressure rod comprises two detachable parallel arms (6) which are mounted so that they may be moved independently of each other. To that effect, the arms (6) are maintained in a supported position by means of a plate (41) mounted to be capable of swiveling about an axis (42) on the front side of the member (4). A flexible blade (40) mounted below the arms (6) insures that arms are supported in notches provided at the ends of the plate (41). In this arrangement the member (4) is roughly shaped as a U, with the back member (5) consisting only of a plate fitted into two grooves provided in the sides (8–9) of the front ring (4). Back member or plate (5) may preferably include a lateral projection on each side thereof, such that the plate has a somewhat T-shaped configuration. These projections then rest on sides (8–9) to support the plate relative thereto. As shown in FIG. 10, this back member (5) may include a flexible blade (43) acting as a spring blade against which the cam operating the tightening and locking of the assembly against the column (3), can bear.

This embodiment is particularly interesting not only because of its extreme simplicity, but also because of the fact that it permits the fastening of workpieces (1) with varying configurations, such as for example, workpieces of varying thicknesses. In fact, under the action of the lever (7) which, as before, rotatably displaces a subassembly of cam (34), not only is the back member (5) tightened against the column (3), but the workpiece (1) is also locked in position due to the swivel assembly of each of the arms (6) on the front ring (4). This will occur even when the workpiece has a varying thickness, as illustrated.

The invention presents major advantages in comparison with the previously known locking devices.

In fact, besides its extreme simplicity, the device of this invention is easy to use due to the fact that a single action on the control lever (7) permits both the locking in position of the device on the column (3) and the fastening of a workpiece (1). Furthermore, such fastening of the workpiece may be performed in any position, especially when the column (3) has a circular section. In fact, in this case, it is possible to make the locking device swivel around this column. This is also true when the column (3) has another type of section, for instance a hexagonal section, as illustrated in FIG. 8.

A further advantage is provided by the fact that the locking operation, as well as the release operation once the machining is over, can be performed practically immediately or instantaneously in a simple and effective manner with minimum effort by operating a single lever (7). The invention is, of course, not limited to the embodiments previously described, but also covers all the variations devised without departing from the scope of the invention. Thus, it is obvious that the pressure rod may have configurations other than those described, since the active part of this rod is capable of being selected according to the shape of the workpiece to be machined. Consideration could also be given to reversing the position of the locking means with respect to the column. Furthermore, in the second embodiment, detachable rollers may be utilized, possibly with or without several tracks, thereby making the device suitable for use with different columns.

What is claimed is:

1. A device for locking a workpiece in position on a working plane, the device comprising:
   a column to be mounted to extend perpendicularly from such a working plane and a locking assembly slidably displaceable along the column, the locking assembly comprising:
   two gripping members positioned in opposed relationship on opposed sides of the column for each gripping member to partially embrace the column;
   a pressure member displaceably connected to the gripping members to extend therefrom and to be displaceable relatively thereto; and
   displacement means, including a cam, operable by means of a single control lever to displace the two gripping members towards each other to tighten onto the column, and to cause the pressure member to swivel relatively to the gripping members for locking a workpiece in position on such a working plane.

2. A device for locking a workpiece in position on a working plane, the device comprising:
   a column to be mounted to extend perpendicularly from such a working plane, and a locking assembly slidably displaceable along the column, the locking assembly comprising:
   two gripping members positioned in opposed relationship on opposed sides of the column for each gripping member to partially embrace the column;
   a pressure member displaceably connected to the gripping members to extend therefrom and to be displaceable relatively thereto, said pressure member comprising an assembly including two generally parallel arms which are located on opposed sides of at least one gripping member for the arms to be capable of swiveling independently of one another; and
   displacement means operable by means of a single control lever to displace the two gripping members towards each other to tighten onto the column, and to cause the pressure member to swivel relatively to the gripping members for locking a workpiece in position on such a working plane.

3. A device according to claim 2, in which the displacement means is adapted to displace the gripping members towards each other and is further adapted to cause the pressure member to swivel at generally the same time as said displacement of said gripping members.

4. A device according to claim 1 or claim 3, in which one gripping member comprises two side plates which extend therefrom beyond the column, with the side plates defining grooves forming a bearing, and with the side plates including elements for supporting and guiding the pressure member, in which the displacement means comprises an axle supported in the bearing defined by the side plates, the axle having two sets of cams, in which the device includes a lever for pivotably displacing the axle, and in which one cam is adapted to cooperate with the second gripping member to tighten the gripping members onto the column, and the other cam is adapted to cooperate with the pressure member to cause it to swivel for locking a workpiece on such a working plane.

5. A device according to claim 4, in which the pressure member is in the form of a pressure rod comprising two parallel arms having convergent ends, and in which the arms are supported by sets of two rollers provided on opposed sides of the one gripping member, the rollers of each set being located in planes which are parallel to each other, which extend perpendicularly to the column and which are spaced from each other.

6. A device according to claim 1, in which the two gripping members are in the form of two rollers which are mounted on a common supporting plate, the rollers having notches and being spaced for the notches to embrace opposed portions of the column, the rollers having their axes parallel to each other and extending transversely to the column, and the roller designed to be on the side of the column where the workpiece is to be provided having its axis situated to be above the axis of the other roller relatively to a working plane.

7. A device according to claim 6, in which the pressure member is in the form of a pressure rod which is slidably supported in two spaced bearings provided in the common supporting plate.

8. A device according to claim 6 or claim 7, in which the displacement means for displacing the two notched rollers and for swiveling the pressure member comprises a single axle on which one of the notched rollers is mounted, the axle comprising an eccentric capable of being angularly displaced by means of a single lever.

9. A device according to claim 1 or claim 3, wherein one of said gripping members is a leading gripping member and the other of said gripping members is a trailing gripping member, and in which the pressure member comprises an assembly having two parallel arms which are located on opposed sides of the leading gripping member for the arms to be capable of swiveling independently of each other.

10. A device according to claim 2, in which the two arms are detachable and are held in position by means of a plate which is mounted on the leading gripping member on an axle to permit the plate to swivel, and by means of a flexible blade which holds the arms in engagement with the plate.

11. A device according to claim 2, in which the leading gripping member has a pair of side plates extending therefrom beyond the trailing gripping member, in which the displacement means comprises a cam to be pivotably displaced by a single lever for bearing against the trailing gripping member and for swiveling the arms of the pressure member, and in which the cam is pivotably supported in openings provided in the side plates, the openings being enlarged relatively to the periphery of the cam to facilitate pivotal displacement of the cam.

12. A device for locking a workpiece in position on a working plane, the device comprising:
a working plane for supporting a workpiece;
a column mounted to extend perpendicularly from the working plane; and
a locking assembly slidably displaceable along the column;
the locking assembly comprising:
two gripping members positioned in opposed relationship on opposed sides of the column for each gripping member to partially embrace the column;
a pressure member displaceably connected to the gripping members to extend therefrom and to be displaceable relatively thereto and thus relatively to the working plane; and
displacement means, including a cam, operable by means of a single control lever to displace the two gripping members towards each other to tighten onto the column, and to cause the pressure member to swivel relatively to the gripping members towards the working plane for locking a workpiece in position on such a working plane.

13. A locking assembly for use in locking a workpiece in position on a working plane, the assembly comprising:
two gripping members which are located in opposed relationship to define a zone between them for slidably receiving a column extending from such a working plane;
a pressure member displaceably connected to the gripping members to extend therefrom and to be displaceable relatively thereto; and
displacement means, including a cam, operable by means of a single control lever, to displace the two gripping members towards each other for firmly engaging with such a column, and to cause the pressure member to swivel relatively to the gripping members for locking such a workpiece in position on such a working plane.

14. A device for locking a workpiece in position on a working plane, the device comprising:
a working plane for supporting a workpiece;
a column mounted to extend perpendicularly from the working plane; and
a locking assembly slidably displaceable along the column; the locking assembly comprising:
two gripping members positioned in opposed relationship on opposed sides of the column for each gripping member to partially embrace the column;
a pressure member displaceably connected to the gripping members to extend therefrom and to be displaceable relatively thereto and thus relatively to the working plane, said pressure member comprising an assembly including two generally parallel arms which are located on opposed sides of one gripping member for the arms to be capable of swiveling independently of one another; and
means operable by means of a single control lever to displace the two gripping members towards each other to tighten onto the column, and to cause the pressure member to swivel relatively to the gripping members towards the working plane for locking a workpiece in position on such a working plane.

15. A locking assembly for use in locking a workpiece in position on a working plane, the assembly comprising:

two gripping members which are located in opposed relationship to define a zone between them for slidably receiving a column extending from such a working plane;

a pressure member displaceably connected to the gripping members to extend therefrom and to be displaceable relatively thereto said pressure member comprising an assembly including two generally parallel arms which are located on opposed sides of one gripping member for the arms to be capable of swiveling independently of one another; and means operable by means of a single control lever, to displace the two gripping members towards each other for firmly engaging with such a column, and to cause the pressure member to swivel relatively to the gripping members for locking such a workpiece in position on such a working plane.

* * * * *